(12) United States Patent
Jinzenji et al.

(10) Patent No.: US 6,543,289 B1
(45) Date of Patent: Apr. 8, 2003

(54) ROTATIONAL VIBRATION TESTING APPARATUS

(75) Inventors: Akihide Jinzenji, Inagi (JP); Keiji Aruga, Machida (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/617,688

(22) Filed: Jul. 17, 2000

(30) Foreign Application Priority Data

Sep. 24, 1999 (JP) .......................................... 11-269743

(51) Int. Cl.[7] .................................................. G01M 7/02
(52) U.S. Cl. .......................................... 73/668; 73/663
(58) Field of Search ........................... 73/662, 663, 664, 73/665, 666, 667, 668

(56) References Cited

U.S. PATENT DOCUMENTS 5,644,087 A * 7/1997 Liu ............................. 73/663
5,652,710 A * 7/1997 Fujii et al. ..................... 73/663
6,330,828 B1 * 12/2001 Nagl et al. ..................... 73/668

* cited by examiner

*Primary Examiner*—Hezron Williams
*Assistant Examiner*—Rose M. Miller
(74) *Attorney, Agent, or Firm*—Greer, Burns, Crain, Ltd.

(57) ABSTRACT

A small-sized rotational vibration testing apparatus having a wide band of measuring frequencies and capable of directly driving a rotary table (1) to oscillate or vibrate in a rotational direction under the action of torque generated by a vibration applying mechanism. The rotary table (1) is rotatably mounted on a base (2), and a plurality of coil frames (14) each having a coil (13) attached thereto are mounted on a flange (1c) of the rotary table (1) at an equal circumferential pitch or interval about its axis of rotation. A plurality of magnetic circuits (12) are fixedly secured to the base (2) in such a manner that the center of each coil (13) is positioned at the center of an associated magnetic circuit (12).

20 Claims, 13 Drawing Sheets

FIG. 3
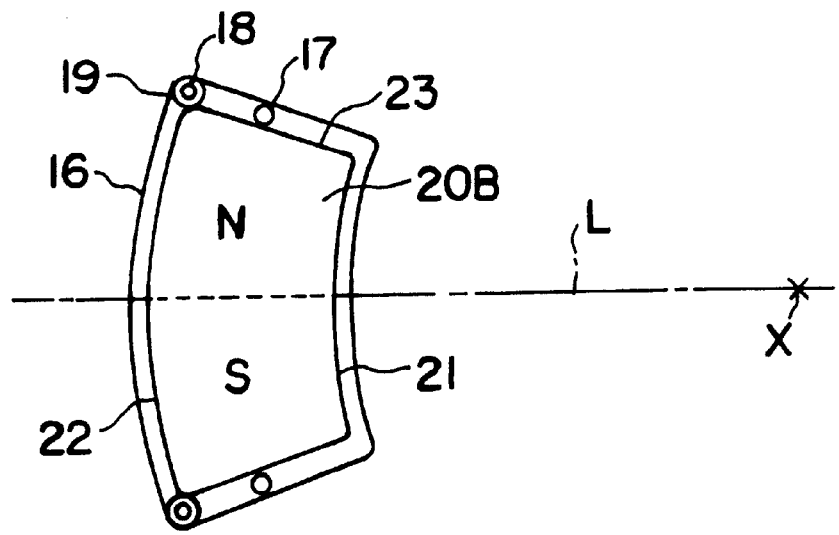
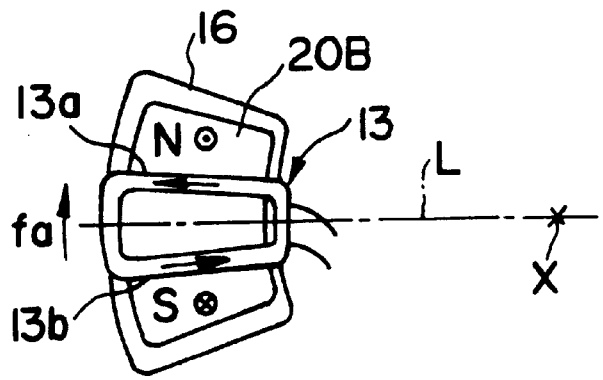
FIG. 4 (a)
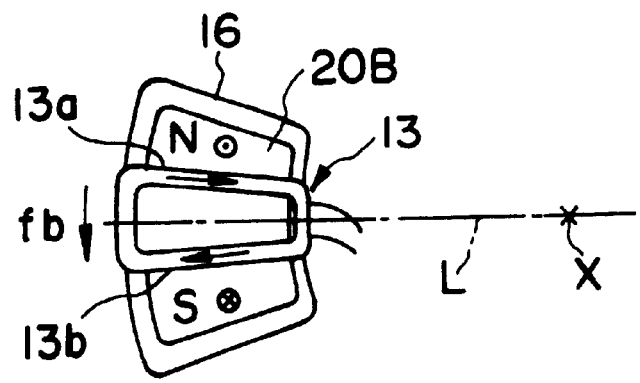
FIG. 4 (b)

ROTATIONAL VIBRATION TESTING APPARATUS

BACKGROUND OF THE INVENTION

1. Field of the Invention

The present invention relates to a rotational vibration testing apparatus which is applicable to assessing the rotational vibration of a rotating object such as, for example, a magnetic disk and the like.

2. Description of the Related Art

In recent years, with magnetic disk drives, the density of tracks per inch is increasing, and the speed in seeking is becoming faster and faster, as a result of which it becomes important to enhance the accuracy of positioning a magnetic head. On the other hand, a rotary actuator is used as a rotating drive source for such magnetic disk drives, and such an actuator has a weak structure against rotational external disturbances, i.e., vibrations or oscillations in a direction in which a magnetic disk is driven to rotate. The rotational disturbances increasingly affect the positioning accuracy in an adverse manner.

In these circumstances, in the development of magnetic disk drives, it is essential to perform assessment against rotational vibrations thereof and take effective and satisfactory measures to cope with such a problem. Thus, it is highly desirable to provide a small-sized rotational vibration testing apparatus with a wide band of measuring frequencies.

Conventionally, as described in U.S. Pat. No. 5,644,087 for example, a rotational vibration testing apparatus has been proposed in which a unidirectional vibration produced by a rectilinear vibration generator is converted into a rotational vibration and transmitted to a rotary table by means of a link mechanism, so that the rotary table is thereby forced to vibrate or oscillate about an axis of rotation thereof.

Since the conventional rotational vibration testing apparatus is constructed to convert the rectilinear reciprocating vibration generated by the rectilinear vibration generator into a rotational reciprocating vibration by means of the link mechanism, as described above, there arises a problem in that the measuring frequency band is limited due to the resonance of the link mechanism.

Moreover, a combination of the rectilinear vibration generator and the link mechanism results in another problem in that the size of the apparatus is enlarged, substantially reducing transportability thereof.

SUMMARY OF THE INVENTION

The present invention is intended to obviate the above-mentioned problems, and has for its object to provide a small-sized rotational vibration testing apparatus in which the torque generated by a vibration applying source is directly transmitted to a rotary table while omitting a link mechanism conventionally required, and which has a wide band of measuring frequencies.

Bearing the above object in mind, according to a first aspect of the present invention, there is provided a rotational vibration testing apparatus comprising: a base; a rotary table rotatably supported on the base through a shaft; and a vibration applying mechanism for driving the rotary table to oscillate or vibrate in a rotational direction about the axis of the shaft which acts as an axis of rotation. The vibration applying mechanism comprises: a magnetic field generating unit for generating magnetic fields; a coil unit arranged to traverse the magnetic fields generated by the magnetic field generating unit, and a power supply unit for supplying current to the coil unit while alternately changing the direction of flow of the current. One of the magnetic field generating unit and the coil unit is mounted on the base, and the other thereof is mounted on the rotary table.

With this arrangement, there is no need for a conventional link mechanism, so it is possible to avoid the limitations on the band of measuring frequencies due to the characteristics of such a link mechanism, thus making it possible to provide a small-sized rotational vibration testing apparatus having a wide band of measuring frequencies.

In a preferred form of the invention, the rotary table comprises: a mounting plate having a first surface for mounting thereon of an object to be tested and a second surface on the opposite sides thereof; and the shaft mounted upright on the second surface of the mounting plate and having an axis thereof disposed in coincidence with a center of the mounting plate, the shaft being rotatably supported on the base. The coil unit is mounted on either one of the mounting plate and the shaft.

With this arrangement, mounting the coil unit on the rotary table serves to reduce the weight of the rotary table and transmit a magnetic force created by the coil unit to the rotary table in an efficient manner in comparison with the case where the magnetic field generating unit is mounted on the rotary table.

In another preferred form of the invention, the coil unit is attached to a coil frame unit which is mounted on either one of the mounting plate and the shaft.

This arrangement serves to improve the assemblability of the coil unit.

In a further preferred form of the invention, the coil unit comprises a plurality of coils attached to the coil frame unit.

Preferably, the coil frame unit comprises a single coil frame. The coil frame may include an annular engaging body adapted to be fixedly mounted on the outer periphery of the rotary table; and a plurality of coil mounting portions disposed on the outer periphery of the annular engaging body at an equal circumferential pitch and extending radially outward from the annular engaging body.

Preferably, the annular engaging body and the plurality of coil mounting portions are formed integral with each other.

Preferably, the coil frame unit comprises a plurality of coil frames to which the coils can be respectively attached, the coil frames being adapted to be fixedly mounted on the outer periphery of the rotary table.

Thus, attaching the coils to the coil frame unit serves to ensure a proper positional relation between the coils, enhancing the assemblability of the coils.

In a still further preferred form of the invention, the rotational vibration testing apparatus further comprises a positioning engagement portion provided on the mounting plate for positioning the coil frames.

Preferably, the positioning engagement portion comprises at least one groove or step formed on the outer peripheral portion of the rotary table, the plurality of coil frames being adapted to be fitted into the at least one groove whereby they are mounted on the rotary table.

This arrangement serves to ensure a proper mutual positional relation between the coils and the rotary table, contributing to improvements in the assemblability thereof.

In a yet further preferred form of the invention, the magnetic field generating unit comprises a plurality of magnetic field generators, and the coil unit comprises a plurality of coils, wherein the magnetic field generators and the coils are arranged in pairs at an equal circumferential pitch about the axis of rotation.

With this arrangement, magnetic forces generated by the coils when power is supplied to the coils are transmitted to the rotary table in a well-balanced manner, so there takes place stable rotational vibration in a rotational direction of the, rotary table.

In a further preferred form of the invention, the rotational vibration testing apparatus further comprises a position returning mechanism for returning a positional relation between the coil unit and the magnetic field generating unit to a predetermined positional relation when power supplied to the coil unit is stopped.

Preferably, the position returning mechanism comprises a resiliently operated mechanism for resiliently generating a returning force for returning the positional relation between the coil unit and the magnetic field generating unit to the predetermined positional relation.

Preferably, the position returning mechanism comprises a magnetically operated mechanism for magnetically generating a returning force for returning the positional relation between the coil unit and the magnetic field generating unit to the predetermined positional relation.

Preferably, the rotational vibration testing apparatus further comprises a cooling unit for cooling the coil unit.

With the above arrangement, it is possible to prevent damages such as breakage of the magnetic field generating unit and/or the coil unit resulting from possible deviations in the position of the coil unit.

In a further preferred form of the invention, the rotational vibration testing apparatus further comprises a current feedback circuit for feeding back a coil current supplied to the coil unit so as to control the coil current to a constant level.

With this arrangement, the current flowing through the coil unit becomes constant, so the coil unit is able to generate a constant force, thereby giving rise to rotational oscillation or vibration with a constant acceleration. Thus, the apparatus can be applied to high precision tests.

In a further preferred form of the invention, the rotational vibration testing apparatus further comprises an acceleration sensor for sensing an acceleration of the rotary table, wherein an output of the acceleration sensor is fed back so as to control a coil current supplied to the coil unit to thereby make the acceleration of the rotary table to a constant value With this arrangement, even if the testing apparatus happens to resonate, it can nevertheless generate oscillation or vibration of a constant acceleration, as a result of which the apparatus is applicable to tests of still higher precision.

In a further preferred form of the invention, the rotational vibration testing apparatus further comprises: an arm protruded from the rotary table; and a stop adapted to engage the arm for limiting a movement of the arm and hence of the rotary table. The arm and the stop are arranged such that when the rotary table is driven to rotate to an excessive extent so as to engage the stop by means of the vibration applying mechanism.

This arrangement can provide the rotational vibration testing apparatus with an impact testing function.

Preferably, the coil unit comprises a plurality of coils electrically connected in series with each other.

Preferably, the coil unit comprises a plurality of coils electrically connected in parallel with each other.

Preferably, the coil unit comprises a plurality of coils electrically connected with each other in a combination of series and parallel connections.

The above and other objects, features and advantages of the present invention will be more readily apparent to the skilled in the art from the following detailed description of presently preferred embodiments of the invention taken in conjunction with the accompanying drawings.

BRIEF DESCRIPTION OF THE DRAWINGS

FIG. 3 is a plan view showing a positional relation between a lower yoke and a permanent magnet of a magnetic circuit in the rotational vibration testing apparatus in accordance with the first embodiment of the present invention;

FIGS. 4(a) and 4(b) are views explaining the operation of a voice coil motor in the rotational vibration testing apparatus in accordance with the first embodiment of the present invention;

DESCRIPTION OF THE PREFERRED EMBODIMENTS

Now, preferred embodiments of the present invention will be described in detail while; referring to the accompanying drawings.

Figure 1:
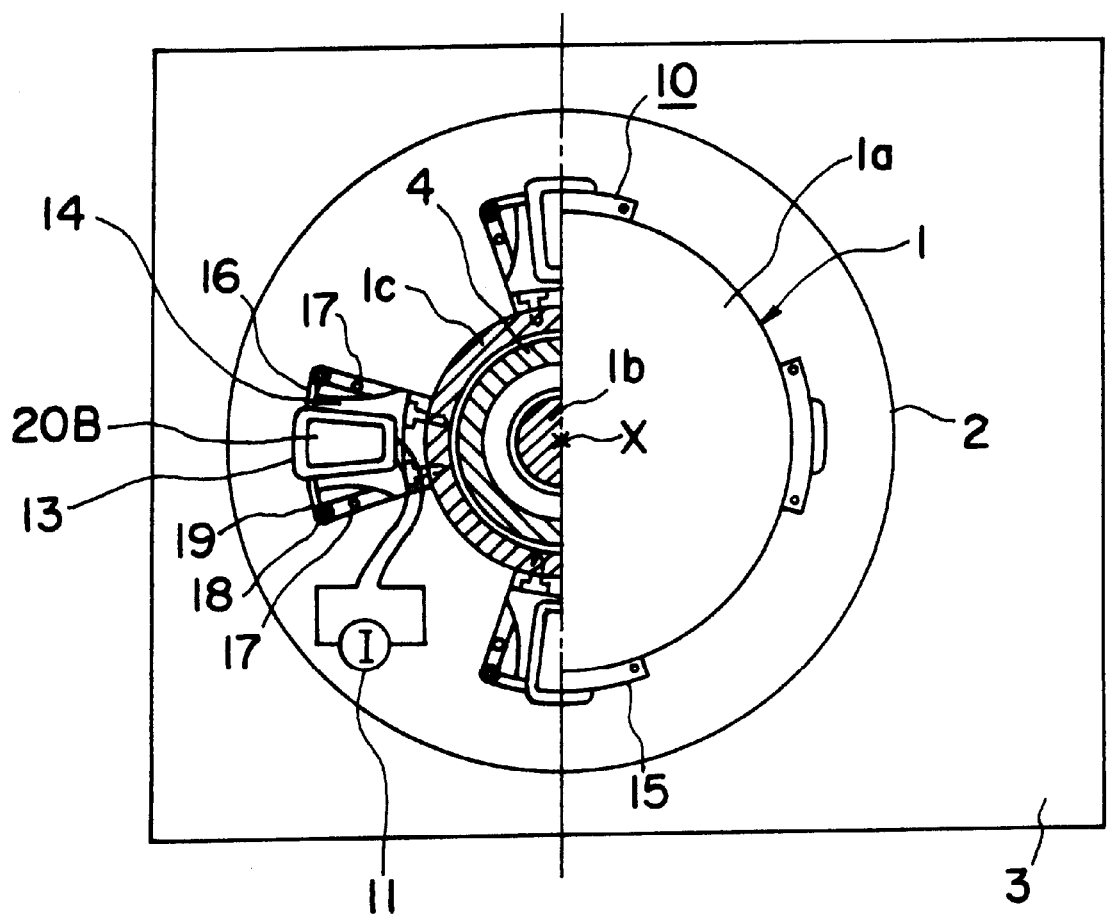
FIG. 1 is a partially cutaway top plan view showing a rotational vibration testing apparatus in accordance with the first embodiment of the present invention.
Figure 2:
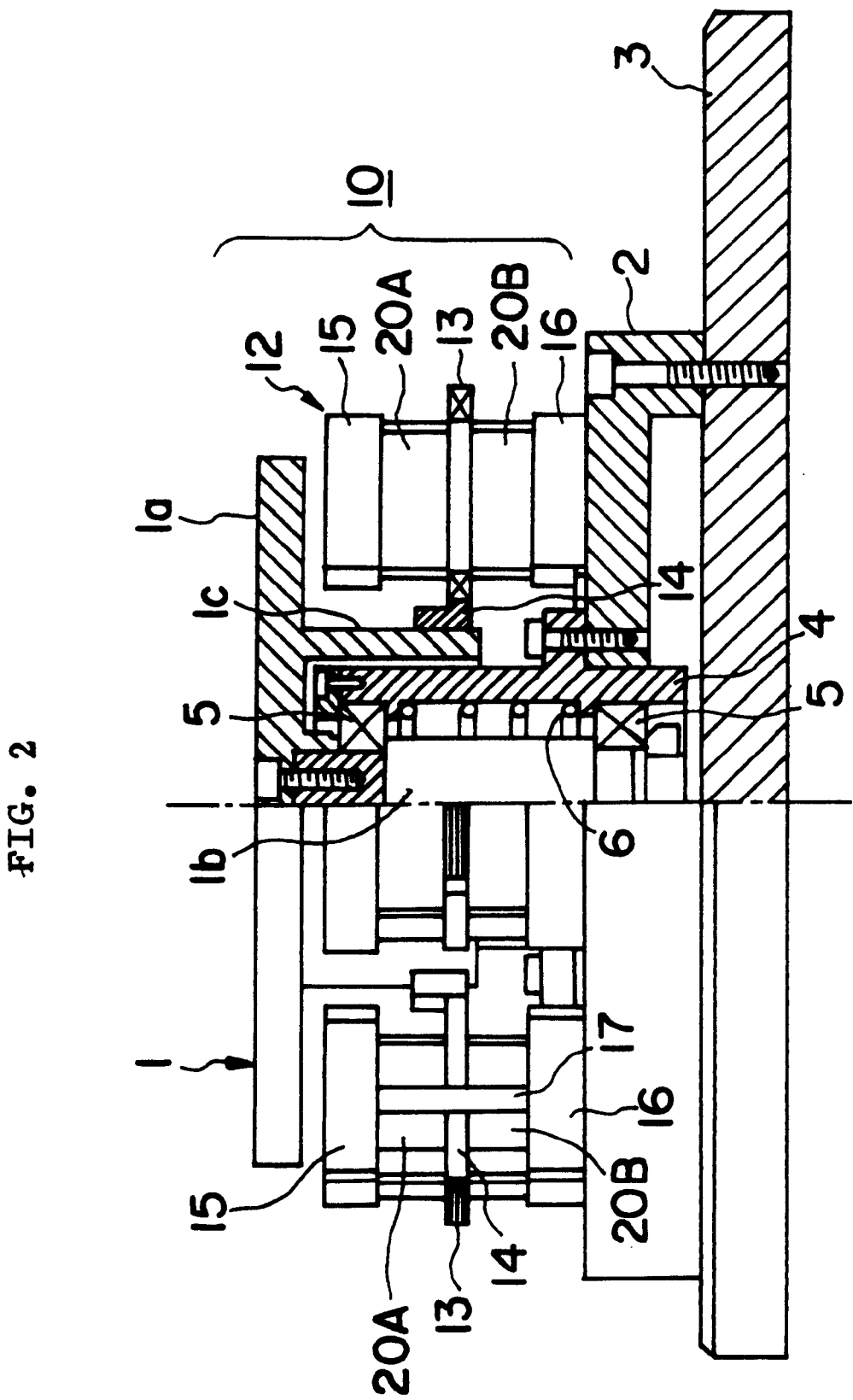
FIG. 2 is a partially cutaway side view showing the rotational vibration testing apparatus in accordance with the first embodiment of the present invention.

FIGS. 1 and 2 show in partially cutaway form the top and side, respectively, of a rotational vibration testing apparatus in accordance with a first embodiment of the invention.

In FIGS. 1 and 2, the rotational vibration testing apparatus is constructed such that it includes a rotary table 1 rotatably mounted on a base 2 for mounting thereon an object to be tested, and a vibration applying source or mechanism comprising a plurality of (e.g., four in the illustrated example) voice coil motors (hereinafter simply referred to as VCM) 10 which are disposed on a circle at an equal circumferential pitch or interval apart from each other about an axis of rotation X of the rotary table 1. The rotational vibration testing apparatus is also provided with a power supply unit 11 for supplying electric power to the VCMs 10.

The rotary table 1 includes a mounting plate 1a in the form of a disc-shaped configuration, a shaft 1b fixedly secured to a lower surface of the mounting plate 1a with its axis placed in a concentric relation with respect to the center of the mounting plate 1a, and a flange 1c of a cylindrical configuration provided on the lower surface of the mounting plate 1a in alignment with the shaft 1b. The axis of the shaft 1b is the center or axis of rotation X of the rotary table 1.

The base 2 is fixedly secured to a platform 3, and a bearing housing 4 is fixedly attached to the base 2. Two bearings 5 are received in the bearing housing 4 with an appropriate preload being applied thereto by means of a coil spring 6. The rotary table 1 is rotatably mounted on the base 2 through the shaft 1b supported by the two bearings 5.

Each of the VCMs 10 comprises a magnetic circuit 12, and a coil 13 adhered to a coil frame 14 formed of aluminum. A plurality of (e.g., four in the illustrated example) coil frames 14 each having a coil 13 mounted thereon are fixedly fastened to the flange 1c at an equal circumferential pitch or interval spaced from each other around the axis of rotation X of the rotary table 1. In this connection, note that the plurality of coil frames 14 together constitute a coil frame unit, and the plurality of coils 13 together constitute a coil unit.

On the other hand, each magnetic circuit 12 comprises an upper yoke 15 and a lower yoke 16 each formed into a substantially trapezoidal configuration, two side yokes 17 for connecting the two upper and lower yokes 15, 16 with each other at their opposite ends, and a magnetic field generator in the form of permanent magnets 20A, 20B adhered to a lower surface of the upper yoke 15 and an upper surface of the lower yoke 16, respectively. The lower yoke 16 is disposed on the base 2, and the upper yoke 15 is disposed in opposition to the lower yoke 16 with the side yokes 17 interposed therebetween, so that the upper and lower yokes 15, 16 are firmly and integrally fastened to the base 2.

In this manner, the upper and lower yokes 15, 16 are magnetically coupled with each other through the side yokes 17. In addition, between the permanent magnet 20A secured to the lower surface of the upper yoke 15 and the permanent magnet 20B secured to the upper surface of the lower yoke 16, there is provided a predetermined space (i.e., a magnetic gap) into which the coil 13 is inserted. In this regard, note that a rubber ring 19 is attached to a stud 18 for dampening abutment between the stud 18 and the coil frame 14.

As shown in FIG. 3, the permanent magnet 20B secured to the lower yoke 16 is a curved flat plate which is surrounded by an inner peripheral surface 21 and an outer peripheral surface 22 disposed in a concentric relation with respect to each other about the axis of rotation X, and two radial surfaces 23. The permanent magnet 20b is divided into a south (S) pole and a north (N) pole by a line which passes through the axis of rotation X and bisects the permanent magnet 20B in a circumferential direction.

On the other hand, the permanent magnet 20A secured to the upper yoke 15 is configured into the same shape as that of the permanent magnet 20B. The permanent magnet 20A is divided into an N pole confronting with the S pole of the permanent magnet 20B and an S pole confronting with the N pole of the permanent:magnet 20B.

Here, the operation of the VCMs 10 will be described with reference to FIGS. 4(a) and 4(b), which are illustrations for explaining the VCM's operation, showing a state in which the upper yoke 15 is removed from the magnetic circuit 12.

Each coil 13 is mounted on the rotary table 1 in such a positional relation that the center of the coil 13 is in coincidence with the line L passing through the axis of rotation X. Each coil 13 has effective or valid portions 13a, 13b positioned in the N pole region and the S pole region, respectively, of the permanent magnet 20B. In the N pole region of the permanent magnet 20B, there is generated a magnetic field running vertically in a direction from the rear surface of the drawing sheet of FIGS. 4(a) and 4(b) toward the front surface thereof, whereas in the S pole region of the permanent magnet 20B, a magnetic field is generated which extends vertically from the front surface of the drawing sheet of FIG. 4 to the rear surface thereof. Thus, current being supplied to each coil 13 is caused to flow through the valid portions 13a, 13b thereof in mutually opposite directions with respect to each other, so that thrust forces are generated in the valid portions 13a, 13b, acting in the same direction.

In FIG. 4(a), current is caused to flow in a counterclockwise direction to thereby generate a thrust force fa in each coil 13, whereby the coils 13 and hence the rotary table 1 are driven to rotate about the axis of rotation X in a clockwise direction.

Also, in FIG. 4(b), current is caused to flow through each coil 13 in a clockwise direction, thus giving rise to a thrust force fb acting in the opposite direction of fa, so that the rotary table 1 is driven to rotate about the axis of rotation X in a counterclockwise direction.

In this manner, by alternately switching over the direction of current flow passing through each coil 13 by means of the power supply unit 11, the rotary table 1 is caused to oscillate or swing about the axis of rotation X within a predetermined angular range, i.e., undergoes oscillation or vibration in the rotating direction (hereinafter simply referred to as rotational vibration).

In this regard, it is to be noted that in this embodiment, the rotary table 1 is constructed so as to be oscillatable within the range of ±2 degrees. Also, the four coils 13 are electrically connected in series with each other so that when supplied with current, they generate electromagnetic forces acting in the same direction.

Next, reference will be made to the operation of the rotational vibration testing apparatus as constructed above.

First, an object to be tested in the form of a magnetic disk drive is fixedly mounted on the mounting plate 1a of the rotary table 1. Then, alternating current of a predetermined frequency is supplied from the power supply unit 11 to the coils 13 to drive the rotary table 1 to alternately rotate in the opposite directions or oscillate within the angular range of ±2 degrees about the axis of rotation X. As a result, the magnetic disk drive is subjected to rotational vibration for testing and assessment thereof against external rotational disturbances.

Here, the performance of the rotational vibration testing apparatus as constructed above will be described.

An electromagnetic force F generated by a VCM 10 when current of 1 ampere is supplied to each coil 13 is determined by the following equation:

$$F = B \times L \ (N/A)$$

where the density of magnetic flux in the magnetic circuit 12 is B g(T) and the effective or valid length of each coil 13 is L (m).

Thus, when a predetermined number (n) of VCMs 10 are employed and connected in series with each other, a total torque generated by the n VCMs 10 is expressed as follows:

$$T = nF \times r = nB \times L \times r$$

where the distance from the axis of rotation X to each coil 13 is r (m).

On the other hand, the performance of the rotational vibration testing apparatus under no-load or unloaded condition is expressed as follows:

$$d^2\theta n/dt^2 = T/J = (nB \times L \times r)/J \ (rad/s^2/A)$$

where the inertial moment of the rotary table 1 is J (Kgm$^2$).

Figure 5:
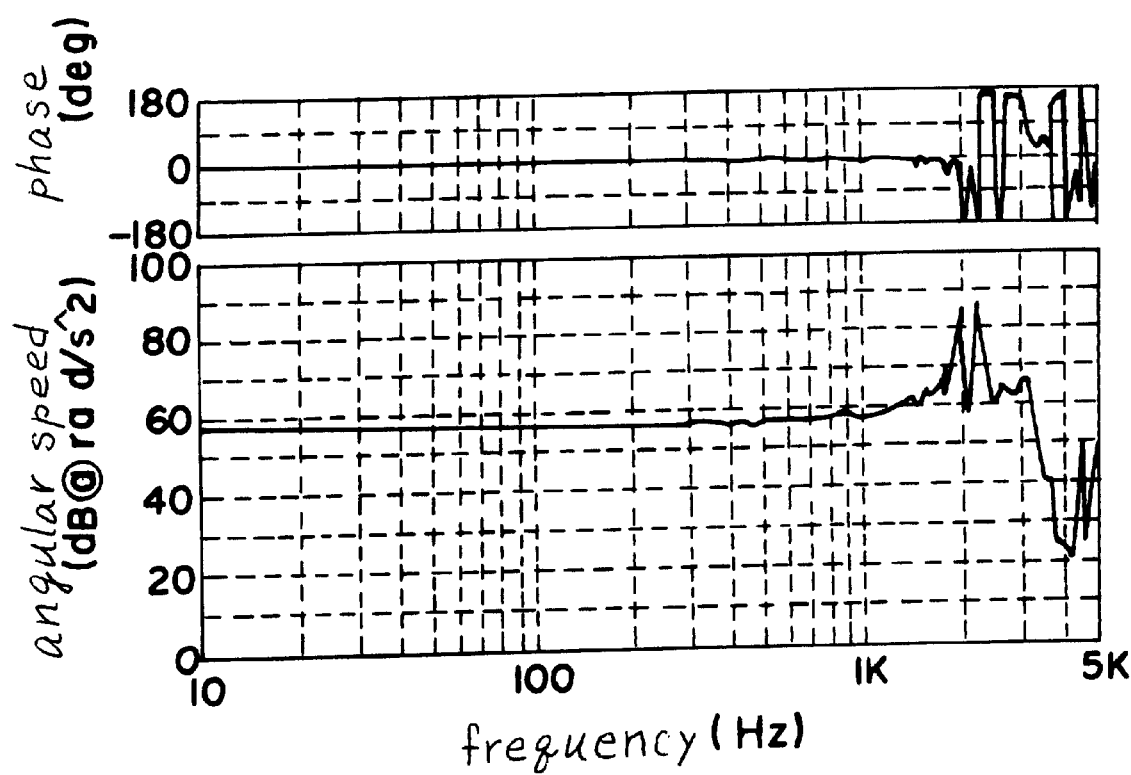
FIG. 5 is a graphical representation showing the frequency characteristics of the rotational vibration testing apparatus in accordance with the first embodiment of the present invention.

In this embodiment, as shown in FIG. 5, under no load and at a frequency band of not greater than 1 KHz, the apparatus exhibits an excellent performance (i.e., $d^2\theta/dt^2 = 670$ (rad/s$^2$/A)), that is, it achieves about 57 dB in terms of a decibel designation.

Incidentally, FIG. 5 shows the frequency characteristics of the rotational vibration testing apparatus according to this embodiment, from which it is found that up to about 1 KHz, acceleration is substantially constant, i.e., around 57 dB (rad/s$^2$) for a current of 1 A, and the phase is substantially 0 degrees up to about 1 KHz as in the case of acceleration. Thus, the apparatus exhibits a broad band characteristic.

In this manner, according to the first embodiment, since the VCMs 10 are employed as a vibration applying mechanism for generating thrust or torque by which the rotary table 1 is directly driven to oscillate or vibrate in the rotational direction, it is possible to make the rotary table 1 rotationally oscillate far more efficiently than the conventional rotational vibration testing apparatus as referred to before in which a rectilinear reciprocating force is converted into a rotational force through a link mechanism to thereby cause rotational vibration of a rotary table. Moreover, the link mechanism for converting a linear motion into a rotary motion can be omitted, thus contributing to a reduction in size and realizing broadening of the measuring frequency band. In addition, the VCMs 10 are themselves small in size and the number thereof can be increased or decreased as necessary, thus making it easy to adjust the vibration applying force of the apparatus.

Further, since the coils 13 having a total weight lighter than that of the magnetic circuit 12 are mounted on the mounting plate 1a, it is possible to cause rotational vibration of the rotary table 1 in an efficient manner under the action of a thrust force produced by the coils 13 upon current being supplied thereto.

Also, since the coil frame 14 with the coils 13 attached thereto is mounted on the flange 1c of the mounting plate 1a, mounting of the coils 13 onto the rotary table 1 is facilitated.

In addition, the arrangement that the VCMs 10 are disposed at an equal circumferential pitch or interval about the axis of rotation X so that thrust forces respectively produced by the coils 13 upon current being supplied thereto act on the rotary table 1 in a well balanced manner, enabling the rotary table 1 to oscillate or vibrate in the rotational direction in a stable attitude.

Although in the first embodiment, four VCMs 10 are employed, the number of the VCMs 10 employed is not limited but optional as desired as long as they can cooperate with each other to provide a required vibration applying force.

Moreover, it is not necessarily required to arrange the VCMs 10 at an equal circumferential pitch or interval, but it is preferable to dispose them in this way so as to permit a thrust force generated to act on the rotary table 1 in a balanced manner.

Further, although in the first embodiment, the magnetic circuit 12 is mounted on the base 2 and the coils 13 are mounted on the rotary table 1, the magnetic circuit 12 may be mounted on the rotary table 1 and the coils 13 may be mounted on the base 2 with substantially the same effects.

Still further, although in the first embodiment, four coils 13 are connected in series with each other, they may be connected in parallel with each other or in a combination of serial and parallel arrangements while taking account of the resistances and inductances of the coils 13, thereby providing a circuit in compliance with the required specification of the power supply unit 11.

EMBODIMENT 2

Although in the aforementioned first embodiment, VCMs 10 are employed with the coils 13 disposed in their horizontal attitude (i.e., the valid portions 13a, 13b being arranged horizontal), a second embodiment of the present invention uses VCMs having coils 13 disposed in their vertical attitude (i.e., the valid portions 13a, 13b being disposed vertically).

Figure 6:
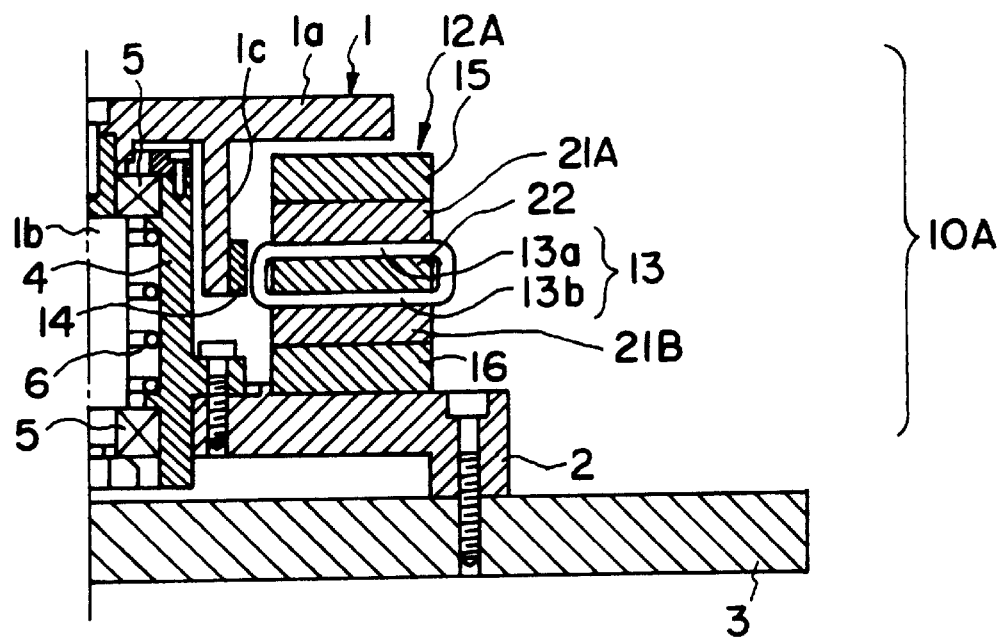
FIG. 6 is a cross sectional view showing a rotational vibration testing apparatus in accordance with a second embodiment of the present invention.

FIG. 6 is a cross sectional view showing a rotational vibration testing apparatus in accordance with the second embodiment of the invention.

In FIG. 6, a vibration applying mechanism in the form of a VCM 10A comprises a magnetic circuit 12A, and coils 13 attached to coil frames 14 through a fastening element such as an adhesive or the like. The four coils 14 each mounting a coil 13 thereon are fixedly secured to a flange 1c at an equal circumferential pitch or interval about the axis of rotation X thereof.

The magnetic circuit 12A includes a yoke structure comprising an upper yoke 15, a lower yoke 16, an intermediate yoke 22 and side yokes (not shown) connected with ends of the upper, lower and intermediate yokes 15, 16 and 17 so as to form a substantially trapezoidal configuration, and a pair of permanent magnets 21A, 21B secured through an adhesive or the like to the upper and lower surfaces of the upper yoke 15. The permanent magnet 21A is formed into a curved plate as in the case of the permanent magnet 20A of the aforementioned first embodiment, and has a lower surface magnetized to an N pole. Similarly, the permanent magnet 21B is shaped into the same configuration as the permanent magnet 21A and has an upper surface magnetized to an N pole. Between the upper permanent magnet 21A and the intermediate yoke 22 and between the lower permanent magnet 21B and the intermediate yoke 22, respectively, there are formed predetermined spaces or magnetic gaps into which the effective or valid portions 13a, 13b of the coil 13 are inserted and disposed there.

Now, the operation of the VCMs 10A will be described.

Between the permanent magnet 21A and the intermediate yoke 22, there is generated a magnetic field running from the permanent magnet 21A to the intermediate yoke 22, and likewise a magnetic field is created between the permanent magnet 21B and the intermediate yoke 22, running from the former to the latter.

When current is supplied to the coil 13, opposing currents are caused to flow through the effective portions 13, 13b of the coil 13 in the opposite direction with respect to each other, whereby thrust forces are generated in the effective portions 13, 13b, respectively, acting in one and the same direction. Thus, by alternately changing the direction of current supplied to the coil 13 by means of the power supply unit 11, the rotary table 1 is forced to oscillate or vibrate, i.e., perform rotational vibration within a predetermined angular range about the axis of rotation X.

In this manner, the VCMs 10A operate in the same manner as the VCMs 10 do, and hence the second embodiment also provides the same effects as in the case of the aforesaid first embodiment.

EMBODIMENT 3

Although in the aforementioned second embodiment, the coils 13 are mounted on the flange 1c provided on the mounting plate 1a, this third embodiment is constructed such that coils 13 are mounted on a shaft 1b.

Figure 7:
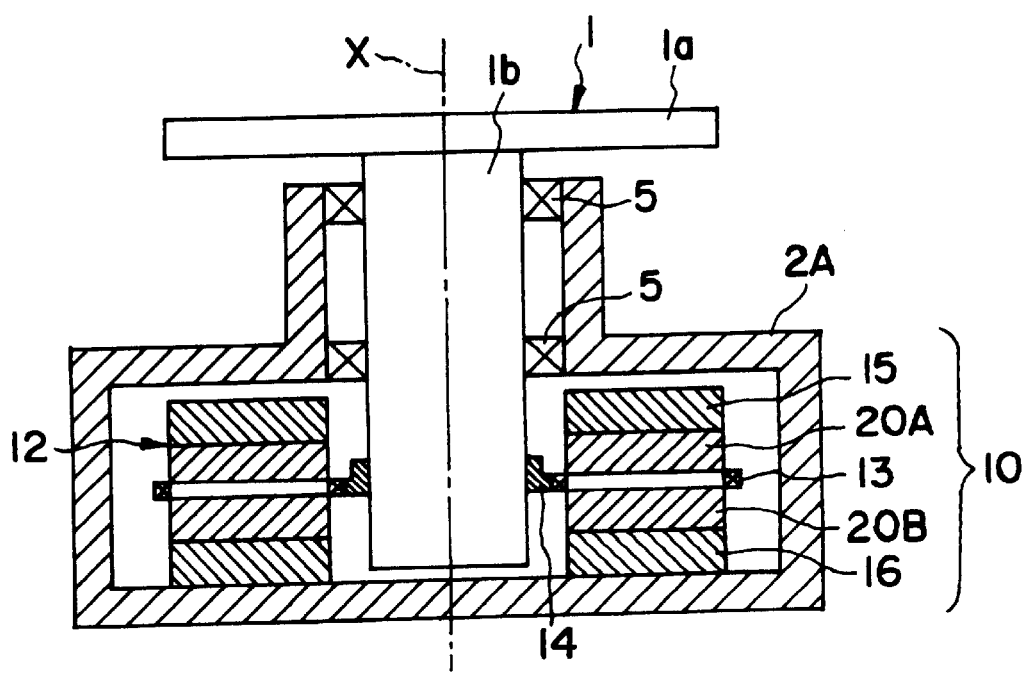
FIG. 7 is a cross sectional view schematically showing a rotational vibration testing apparatus in accordance with a third embodiment of the present invention.

FIG. 7 diagrammatically illustrates in cross section a rotational vibration testing apparatus in accordance with the third embodiment of the present invention.

In FIG. 7, a rotary table 1 is rotatably mounted on a base 2A with its rotating shaft 1b being supported by a pair of bearings 5. A plurality of magnetic circuits 12 are disposed about the axis of the shaft 1b at an equal circumferential pitch or interval and fixedly secured to the shaft 1b. Similarly, a plurality of coil frames 14 each having a coil 13 mounted thereon are fixedly attached to the shaft 1b at an equal circumferential pitch or interval. With such an arrangement, the coil 13 is inserted into a space between the permanent magnet 21A, 21B.

In the third embodiment, when supplied with current, the coils 13 generate thrust forces, which are transmitted to the shaft 1b through the coil frames 14 to thereby rotate the rotary table 1. Thus, alternately changing the direction of current supplied to the coils 13 by means of the power supply unit 11 causes the rotary table 1 to oscillate or vibrate, i.e., perform rotational vibration in a predetermined angular range about the axis of rotation X thereof.

Accordingly, in the third embodiment too, there are provided the same effects as in the case of the first embodiment.

EMBODIMENT 4

Figure 8:
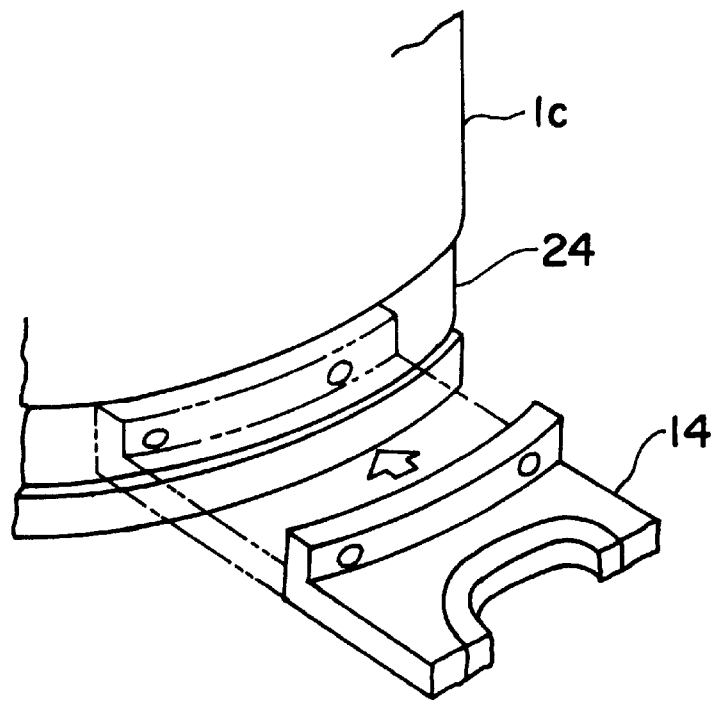
FIG. 8 is a perspective view showing essential portions of a rotational vibration testing apparatus in accordance with a fourth embodiment of the present invention.

In a fourth embodiment, as shown in FIG. 8. a positioning engagement portion in the form of an annular groove or recess 24 is formed on the outer peripheral portion of the flange 1c at its lower end, and a plurality of coil frames 14 are fitted into the groove 24 and fixedly secured to the flange 1c by suitable fastening members such as blots or the like.

In this regard, note that the positioning engagement portion may comprise, instead of the single annular groove or recess 24, a plurality of grooves or recesses formed on the outer peripheral portion of the flange 1c at discrete locations spaced apart from each other in the circumferential direction thereof.

The construction of this embodiment other than the above is similar to that of the aforementioned first embodiment.

In the fourth embodiment, because of the provision of the groove or recess 24 in the flange 1c, the coil frames 14 can be properly positioned simply by engaging the coil frames 14 into the grooves 24. Thus, a highly accurate positional relationship between the magnetic circuit 12 and the coils 13 can be easily attained, improving the assemblability thereof.

EMBODIMENT 5

Figure 9:
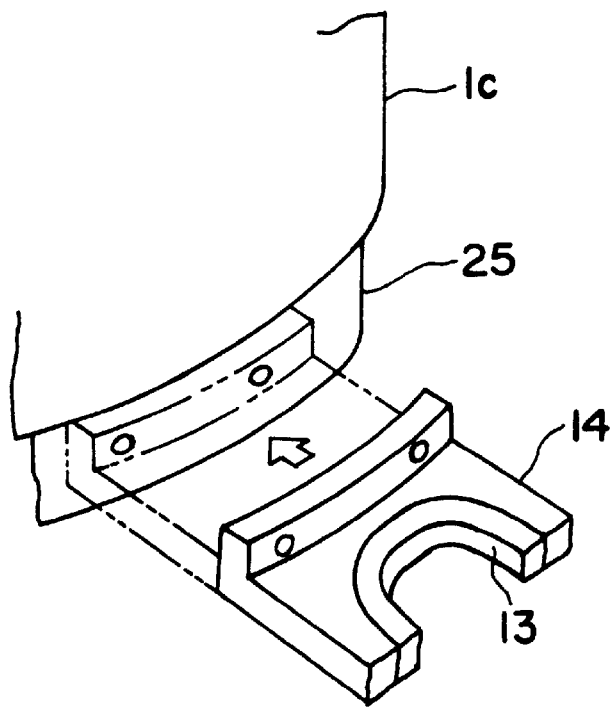
FIG. 9 is a perspective view showing essential portions of a rotational vibration testing apparatus in accordance with a fifth embodiment of the present invention.

Although in the fourth embodiment, the positioning engagement portion in the form of the groove or recess 24 are formed on the outer periphery of the flange 1c at its lower end, according to a fifth embodiment of the present invention, the positioning engagement portion comprises an annular step or notch 25 formed on the lower end of the outer periphery of the flange 1c, as shown in FIG. 9, while providing substantially the same effects as in the fourth embodiment.

Note that in this embodiment too, the positioning engagement portion may include the single annular groove or notch 25 formed on the outer peripheral portion of the flange 1c at discrete locations spaced apart from each other in the circumferential direction thereof.

EMBODIMENT 6

Figure 10:
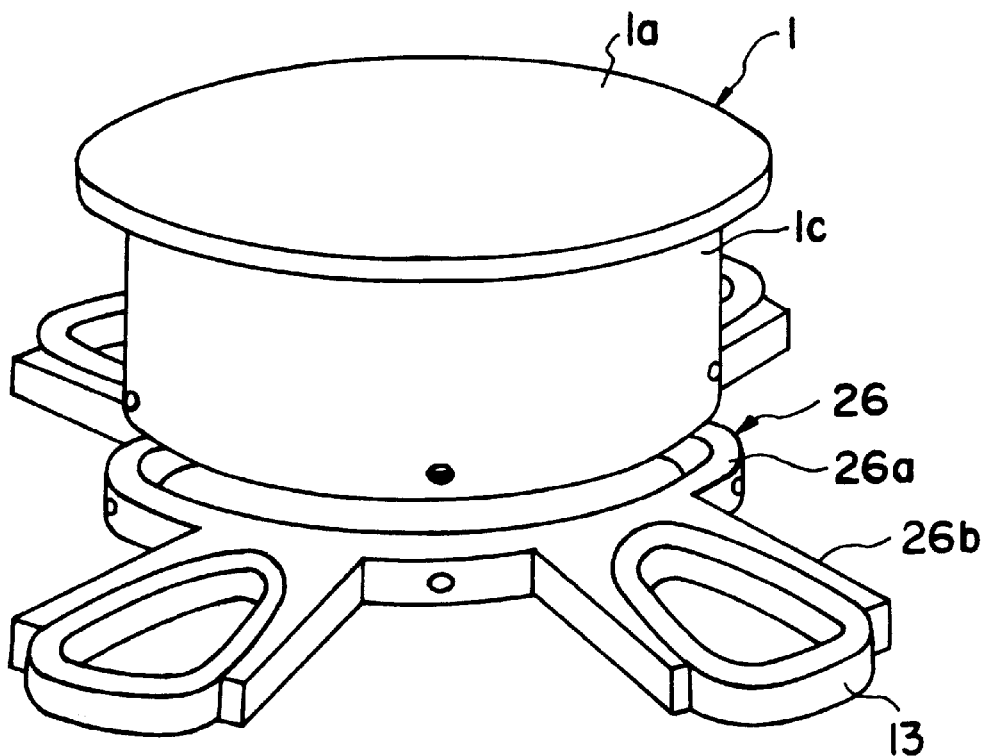
FIG. 10 is a perspective view showing the construction of a coil frame in a rotational vibration testing apparatus in accordance with a sixth embodiment of the present invention.

FIG. 10 shows a sixth embodiment of the present invention employing a coil frame unit in the form of a single coil frame 26. The coil frame 26 comprises an annular engaging body 26a adapted to be fitted on the outer peripheral end portion of a flange 1c of a rotary table 1, and a plurality of (e.g., four in the illustrated example) coil mounting portions 26b which are disposed on the outer periphery of the annular engaging body 26a at an equal circumferential pitch or interval and extend radially outward from the annular engaging body 26a.

The construction of this embodiment other than above is similar to that of the aforesaid first embodiment.

In the sixth embodiment, each coil 13 is first fixedly secured through a suitable fastening element, such as an adhesive or the like to a corresponding coil mounting portion 26b, and then the annular engaging body 26a is fitted into the flange 1c to thereby fixedly attach the coil frame 26 to the flange 1c, whereby the respective coils 13 are mounted to the rotary table 1.

In this manner, the plurality of coils 13 can be mounted on the rotary table 1 all at once, thus contributing to improvements in the assemblability thereof.

In addition, the plurality of coil mounting portions 26b may be formed integral with the annular engaging body 26a, the rigidity of the assembly can be enhanced and the durability thereof is also improved. Moreover, a highly accurate positional relationship among the coil mounting portions 26b and hence the coils 13 can be ensured, thus permitting easy adjustments in the positional relation between the magnetic circuits 12 and the coils 13. This serves to accordingly improve assemblability.

Although in the sixth embodiment four coil mounting portions 26b are shown and described as formed integral with the annular engaging body 26a, the number of them is not limited to four, but may be arbitrary, that is, two, three, five or more coil mounting portions 26b may be formed integral with the annular engaging body 26a, for example.

EMBODIMENT 7

Figure 11:
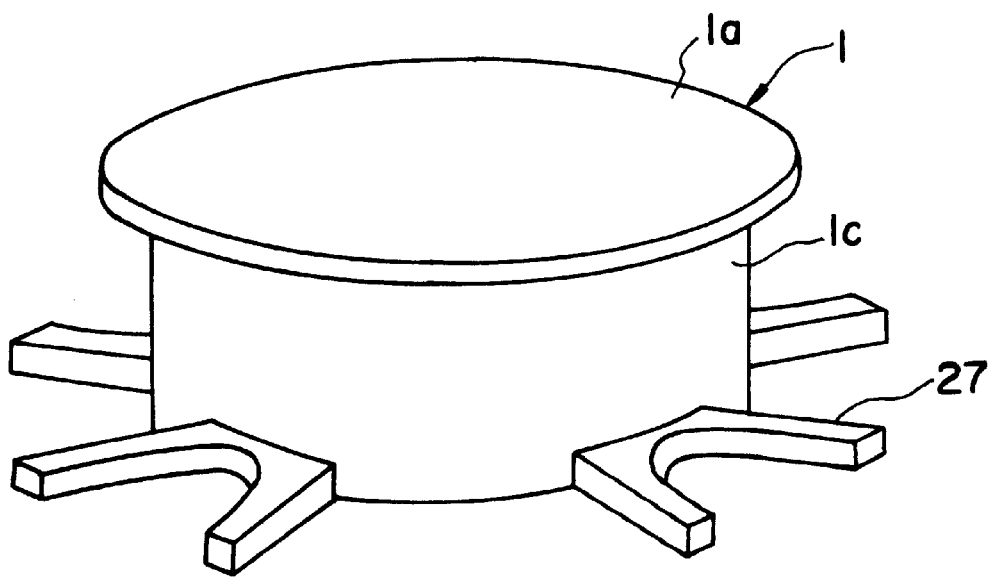
FIG. 11 is a perspective view showing the construction of a coil frame in a rotational vibration testing apparatus in accordance with a seventh embodiment of the present invention.

Although in the sixth embodiment, the plurality of coil mounting portions 26b are formed integral with the annular engaging body 26a, a seventh embodiment of the present invention is constructed such that a plurality of (e.g., four in the illustrated example) coil mounting portions or members 27 are provided on the outer periphery of the flange 1c of the rotary table 1 at an equal circumferential pitch or interval in such a manner as to extend radially outward therefrom, as shown in FIG. 11.

In the seventh embodiment, the coils 13 are mounted on the rotary table 1 by fixing the coils 13 to the respective coil mounting portions 27 through a fastening element such as an adhesive or the like. As a result, a coil frame mounting step can be omitted, thus improving the assemblability thereof. In addition, the integral formation of the coil mounting portions 27 with the flange 1c serves to increase the rigidity and durability of the assembly thereof. A highly accurate positional relationship between the coil mounting portions 27 and hence coils 13 can be ensured, so the positional relation between the magnetic circuit 12 and the coils 13 can be easily adjusted, accordingly improving the assemblability thereof.

EMBODIMENT 8

Figure 12:
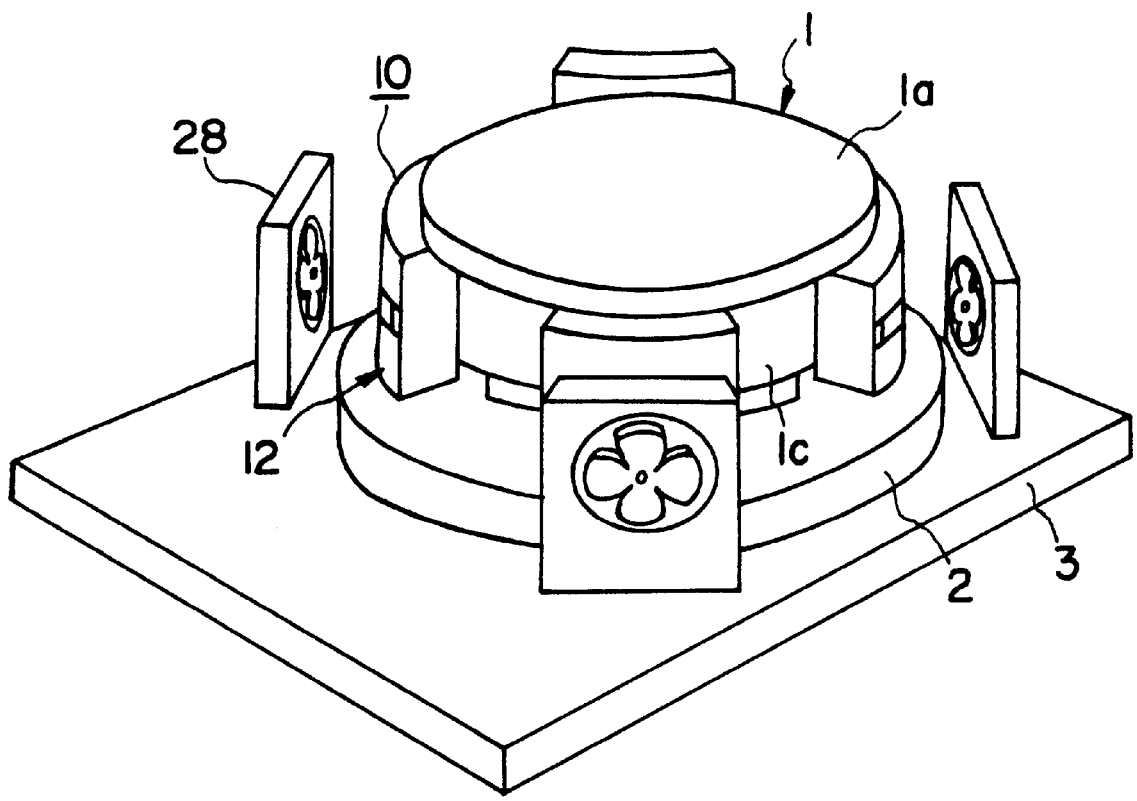
FIG. 12 is a perspective view showing a rotational vibration testing apparatus in accordance with an eighth embodiment of the present invention.

In an eighth embodiment of the present invention, as illustrated in FIG. 12, a cooling unit in the form of a cooling fan 28 is disposed on the outer peripheral side of each VCM 10. The construction of this embodiment other than the above is similar to that of the aforementioned first embodiment.

During the operation of the VCMs 10, a lot of current is supplied to the coils 13, which in turn generate heat. As a result, there arises a problem in that the performance of the rotational vibration testing apparatus is limited by the heat generation of the coils 13.

According to the eighth embodiment, however, during the operation of the VCMs 10, the cooling fans 28 are actuated to supply streams of cooling air to the respective coils 13, thereby suppressing an excessive rise in the temperature of the coils 13. As a consequence, the performance limit of the apparatus can be increased.

EMBODIMENT 9

Figure 13:
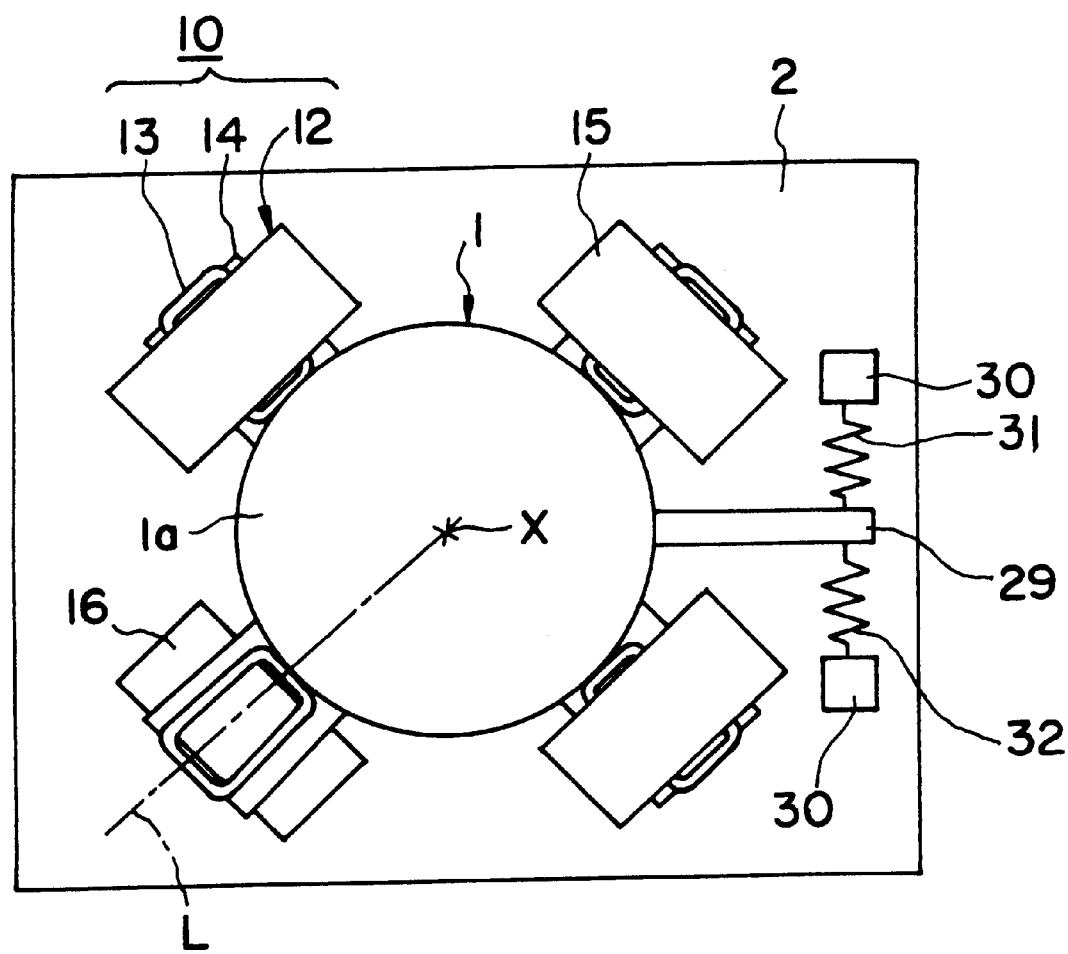
FIG. 13 is a top plan view schematically showing a rotational vibration testing apparatus in accordance with a ninth embodiment of the present invention.

FIG. 13 is a top plan view schematically illustrating a rotational vibration testing apparatus in accordance with a ninth embodiment of the present invention.

In FIG. 13, the arm 29 extends from the flange 1c of the rotary table 1 in a radially outward direction thereof, and a pair of poles 30 stand upright on the base 2 in such a manner as to face each other with an arm 29 interposed therebetween. A pair of coil springs 31, 32 are arranged between the arm 29 and the pair of poles or rods 30, respectively. The arm 29, the pair of poles 30 and the pair of coil springs 31, 32 together constitute a position returning mechanism. The coil springs 31, 32 are set to be balanced with each other in such a manner that the center of each coil 13 coincides with a line L (i.e., the center of the magnetic circuit 12) which passes through the axis of rotation X and bisects the permanent magnets 21A, 20B in a circumferential direction.

Although, in the aforementioned first embodiment, there is a fear that when the VCMs 10 are stopped in their operation, the center of each coil 13 will be displaced or deviated from the center of the magnetic circuit 12 due to external forces resulting from a tensile force or the like applied to a cord of an object to be tested which is mounted on the mounting plate 1a, and an offset of an input force resulting from a DC component of the current flowing through the coils 13. In the event that the rotary table 1 is driven to oscillate in the rotational direction under the action of the VCMs 10 which are operated with the center of each coil 13 being deviated from the center of each magnetic circuit 12, there will be a danger in that the coil frames 14 collide with the rubber rings 19, damaging the coils 13 and the magnetic circuits 12.

According to the eighth embodiment, when the power supply to the coils 13 is ceased, the arm 29 is returned to the balanced position of the coil springs 31, 32, whereby the center of each coil 13 is always restored to the center of the corresponding magnetic circuit 12. This effectively prevents damages such as breakage or the like of the coils 13 and the magnetic circuits 12, which would.otherwise result upon the VCMs 10 being actuated with the center of each coil 13 being out of alignment with the center of the corresponding magnetic circuit 12.

Here, note that when the arm 29 is caused to resonate with the rotational vibration of the rotary table 1, the performance of the testing apparatus might be affected. Thus, to prevent such a phenomenon, it is desirable to increase the rigidity of the arm 29. To this end, a stainless steel arm can preferably be used, for example.

EMBODIMENT 10

Figure 14:
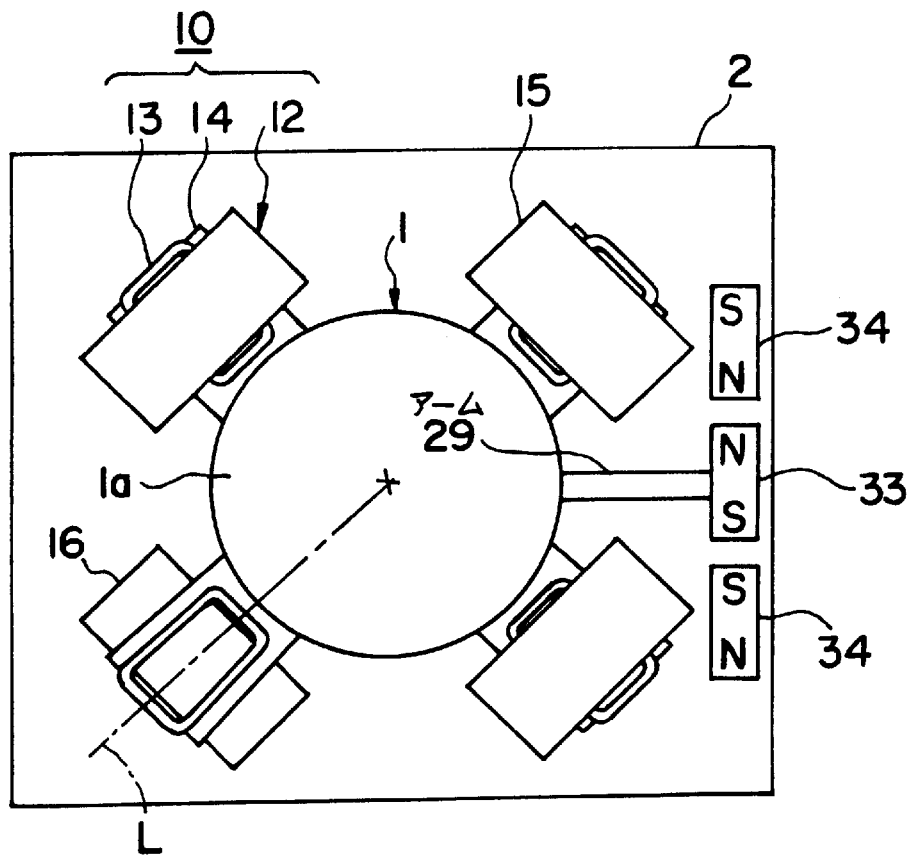
FIG. 14 is a top plan view schematically showing a rotational vibration testing apparatus in accordance with a tenth embodiment of the present invention.

FIG. 14 is a top plan view schematically showing a rotational vibration testing apparatus in accordance with a tenth embodiment of the present invention.

In FIG. 14, an arm 29 extends radially outward from the flange 1c of the rotary table 1 with a magnet 33 being fixedly attached to a distal end of the arm 29, and a pair of magnets 34 are firmly mounted on the base 2 in such a manner that they are arranged on the opposite sides of the magnet 33 in opposition to each other so as to produce repulsive forces acting on the magnet 33 from the opposite sides thereof. The arm 29, the magnet 33 and the pair of magnets 34 together constitute a position returning mechanism, and they are arranged such that when the center of each coil 13 is placed in coincidence with the center of the associated magnetic circuit 12, repulsive forces acting from the, pair of magnets 34 onto the magnet 33 become balanced with each other.

The construction of this embodiment other than the above is similar to that of the aforementioned first embodiment.

According to the tenth embodiment, when the power supply to the coils 13 is stopped, the arm 29 is caused to return to its initial or balanced position under the action of the repulsive forces of the magnets 33, 34 in which position the repulsive forces balance with each other, whereby the center of each coil 13 is always restored to the center of the associated magnetic circuit 12. As a result, it is possible to prevent damages such as breakage or the like of the coils 13 and the magnetic circuits 12, which would otherwise result upon actuation of the VCMs 10 with the center of each coil 13 being deviated from the center of the associated magnetic circuit 12.

EMBODIMENT 11

Figure 15:
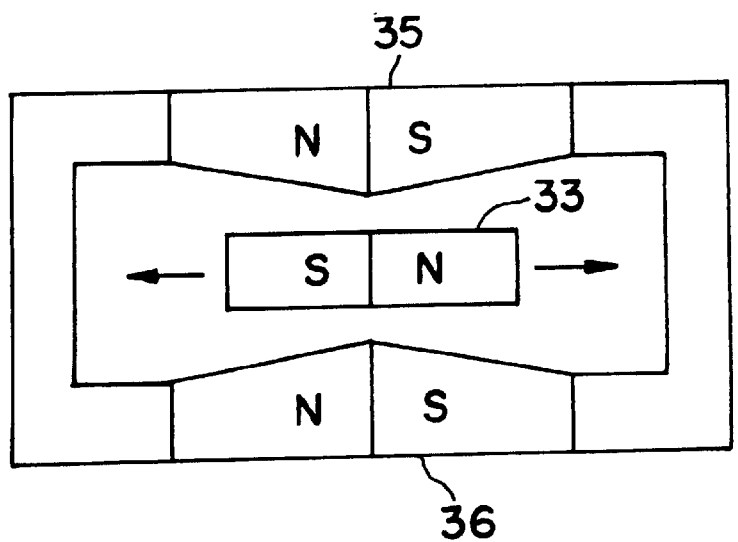
FIG. 15 is a top plan view schematically showing a rotational vibration testing apparatus in accordance with an eleventh embodiment of the present invention.

FIG. 15 is a top plan view schematically showing a rotational vibration testing apparatus in accordance with an eleventh embodiment of the present invention.

In FIG. 15, a magnet 33 is fixedly attached to an unillustrated arm which extends radially outward from a flange of an unillustrated rotary table, as shown in FIG. 14, and a block comprising magnets 35, 36 is firmly secured to an unillustrated base so as to enclose a magnet 33. In this embodiment, the arm, the magnet 33 and the magnets 35, 36 together constitute a position returning mechanism in the form of a block.

The construction of this embodiment other than the above is similar to that of the aforesaid first embodiment.

In the eleventh embodiment, the center of the block comprising the magnets 35, 36 becomes a point of stabilization at which the magnet 33 is made into its balanced or stabilized condition. Accordingly, the block is arranged such that the center thereof is in coincidence with the center of an unillustrated magnetic circuit when the magnet 33 is at the center of that block.

According to the eleventh embodiment, when the power supply to unillustrated coils is cut off, the magnet 33 is forced to return to the central position of the block comprising the magnets 35, 36 under the action of magnetic forces acting between the magnet 33 and the magnets 35, 36, whereby the center of each coil is always restored to the center of its associated magnetic circuit. Thus, in this case too, it is possible to prevent damages such as breakage or the like of the coils and the magnetic circuits, which would otherwise result when unillustrated VCMs are actuated with the center of each coil 13 being deviated from the center of the associated magnetic circuit.

EMBODIMENT 12

Figure 16:
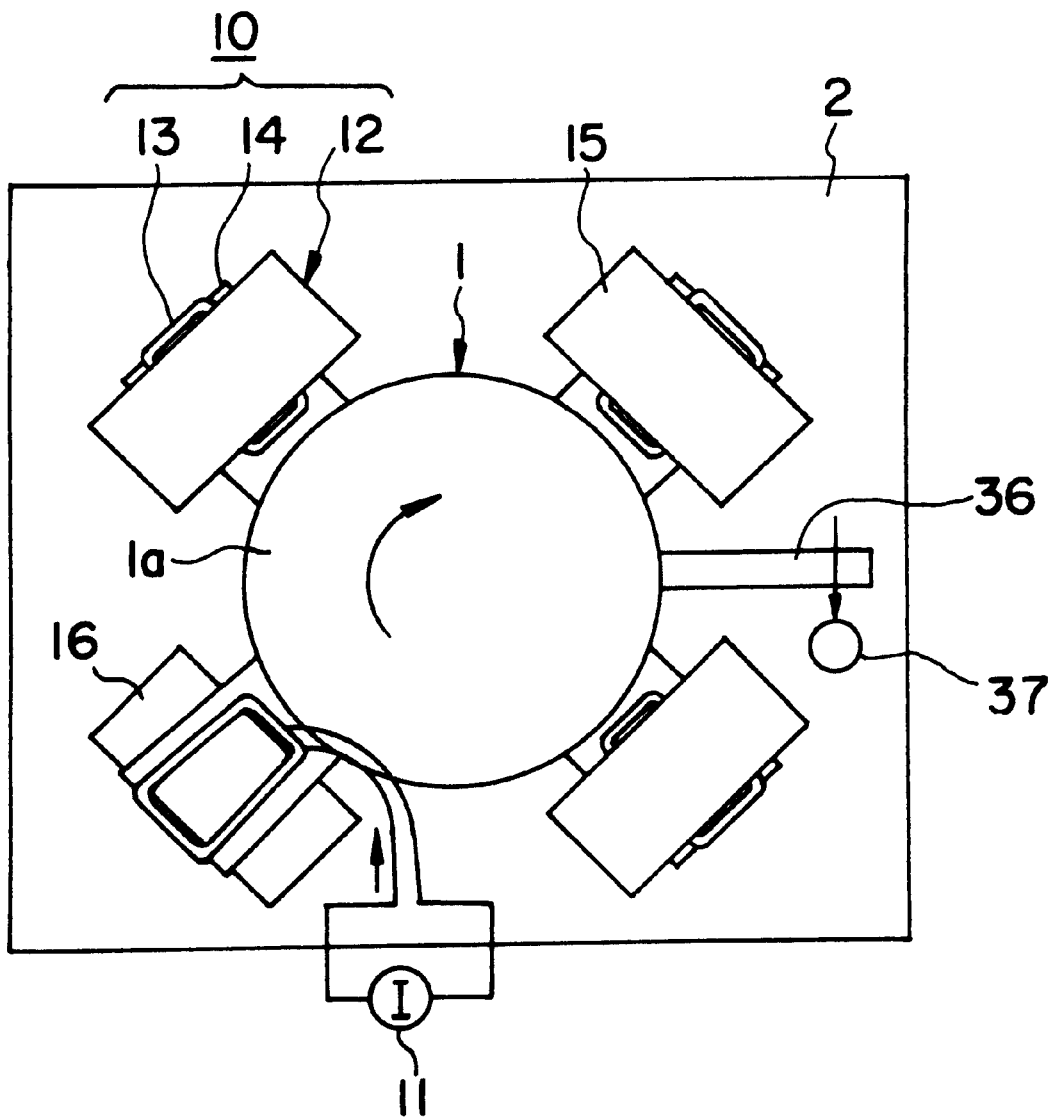
FIG. 16 is a top plan view schematically showing a rotational vibration testing apparatus in accordance with a twelfth embodiment of the present invention.

FIG. 16 is a top plan view schematically showing a rotational vibration testing apparatus in accordance with a twelfth embodiment of the present embodiment.

In FIG. 16, an arm 36 extends radially outward from a flange of a rotary table 1 and a stop 37 is mounted upright on the rotary table 1 so that upon abutting engagement with the arm 36, the stop 37 acts to limit the movement of the arm 36 and hence the rotary table 1.

The construction of this embodiment other than the above is similar to the aforementioned first embodiment.

In the twelfth embodiment, direct current is supplied from the power supply unit 11 to the coils 13 to thereby cause the rotary table 1 to rotate in a direction to an excessive extent so that the arm 36 is brought into abutment or collision agaist the stop 37, thus applying a predetermined shock or impact force to an unillustrated object fixedly mounted on the rotary table 1.

Consequently, according to the twelfth embodiment, there is provided a rotational vibration testing apparatus having an additional impact testing function.

Although in the.twelfth embodiment, provision is made for the arm 36 and the stop 37, arrangement can be made such that the rubber ring (see a reference numeral 19 in FIG. 1) of a magnetic circuit 12 may be utilized so as to make an associated coil frame 14 collide or strike against the rubber ring 19 with the same effects.

EMBODIMENT 13

Figure 17:
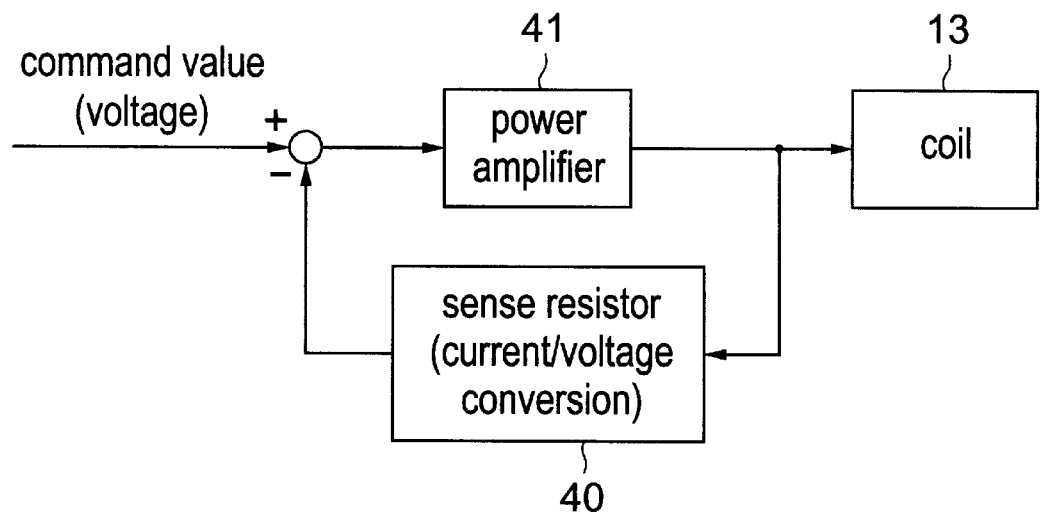
FIG. 17 is a block diagram explaining current control in a rotational vibration testing apparatus in accordance with a thirteenth embodiment of the present invention.

FIG. 17 is a block diagram explaining current control in a rotational vibration testing apparatus in accordance with a thirteenth embodiment of the present invention.

In the thirteenth embodiment, the magnitude of current supplied to each coil 13 of the rotational vibration testing apparatus is detected as a voltage across a sense resistor 40 connected in series with a coil 13, which is fed back to a power amplifier 41 so that the power amplifier 41 operates to make a difference between a command value and the voltage value thus fed back to zero, thereby controlling the current supplied to the coil 13 at a constant level.

Accordingly, by controlling the current supply to each coil 13 at a constant value in this manner, it becomes possible for each VCM 10, which serves to generate a thrust force in proportion to the magnitude of current flowing through its associated coil 13, to produce vibration of a predetermined acceleration. As a consequence, a constant acceleration can be obtained over a wide band of measuring frequencies, permitting the apparatus of the present invention to be applied to rotational vibration tests of high precision.

EMBODIMENT 14

Figure 18:
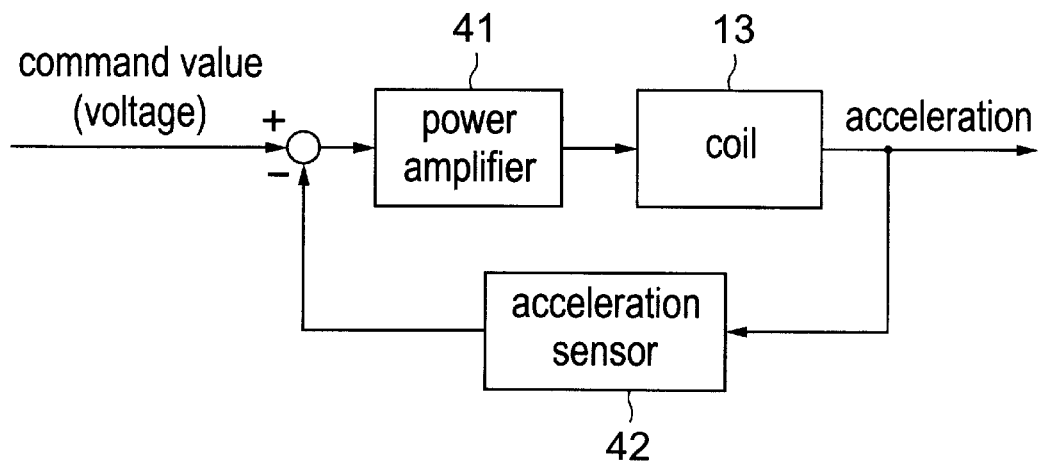
FIG. 18 is a block diagram explaining current control in a rotational vibration testing apparatus in accordance with a fourteenth embodiment of the present invention.

FIG. 18 is a block diagram explaining current control in a rotational vibration testing apparatus in accordance with a fourteenth embodiment of the present invention.

In the fourteenth embodiment, an acceleration sensor 42 such as a piezoelectric accelerometer or the like is attached to an unillustrated rotary table for sensing an acceleration of the rotary table as a corresponding voltage value, which is then fed back to a power amplifier 41. With this arrangement, the power amplifier 41 operates to regulate a difference between a command value and the voltage value thus fed back to zero, thereby controlling the current supplied to a coil 13.

Here, it should be noted that if there exists resonance in a test apparatus, a constant acceleration does not generally take place in the vicinity of a resonance frequency. In this embodiment, however, the magnitude of current supplied to each coil 13 is controlled in such a manner that the acceleration of an unillustrated rotary table is made at a constant value, that is, the current supply to each coil 13 is controlled to the command value, with the result that even if resonance takes place in a test machine, it is possible to cause the test apparatus to oscillate or vibrate with a constant acceleration. As a result, the apparatus can be used for rotational vibration tests of much higher precision.

EMBODIMENT 15

Figure 19:
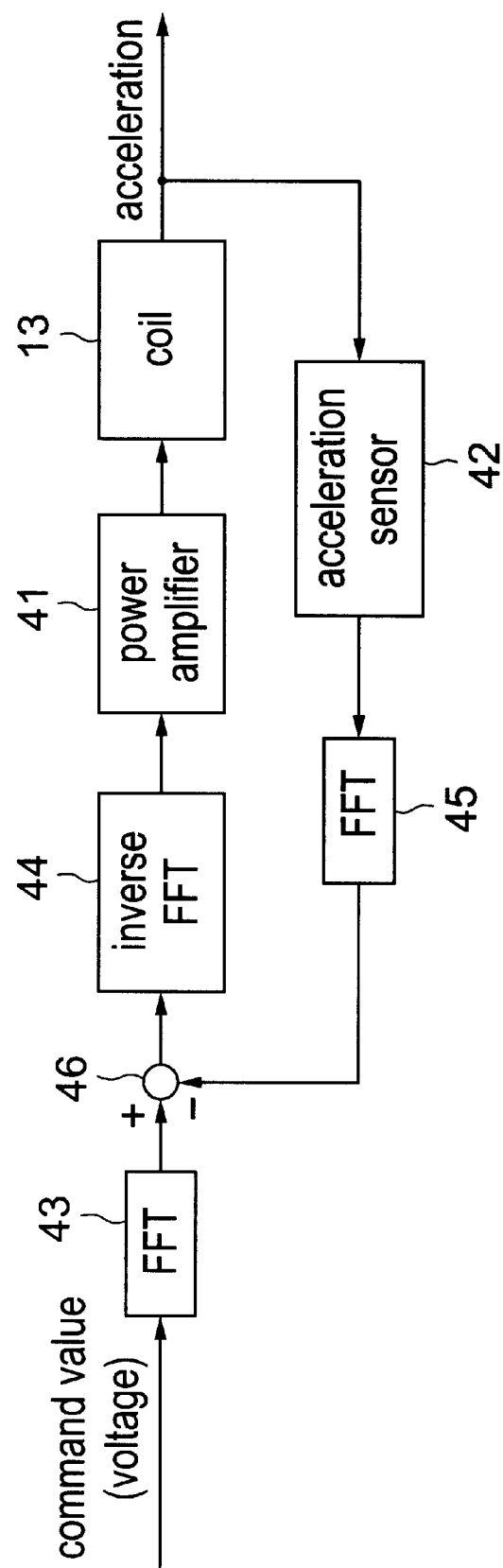
FIG. 19 is a block diagram explaining current control in a rotational vibration testing apparatus in accordance with a fifteenth embodiment of the present invention.

FIG. 19 is a block diagram explaining current control in a rotational vibration testing apparatus in accordance with a fifteenth embodiment of the present invention.

This embodiment is a modification of the fourteenth embodiment which in this case is modified so as to make the amplitude of rotational vibration constant. To this end, a command value in the form of a voltage is subjected to Fourier transform by a fast Fourier transformer (FFT) 43 and then input to an adder 46, and an output of an acceleration sensor 42 is also subjected to Fourier transform by a fast Fourier transformer (FFT) 45 and input to the adder 46. The output of the adder 46 is input to an inverse fast Fourier transformer (inverse FFT) 44, which is provided at the input side of a power amplifier 41. The output of the inverse FFT 44 is input to the power amplifier 41 and thence to a coil 13. With this arrangement, it is possible to control the amplitude of an acceleration during rotational vibration to a constant value, so the apparatus of this embodiment can be applied to rotational vibration tests of high precision.

Although in the respective embodiments described above, the magnetic field generating means comprises a permanent magnet, it is not limited to the permanent magnet but may be anything that is capable of producing magnetic fields. For example, it may be an electric magnet.

As described in the foregoing, according to the present invention, a rotational vibration testing apparatus includes a base, a rotary table rotatably supported on the base through a shaft, a vibration applying mechanism for driving the rotary table to oscillate or vibrate in a rotational direction about the axis of the shaft which acts as an axis of rotation. The vibration applying mechanism comprises a magnetic field generator for generating magnetic fields, a coil arranged to traverse the magnetic fields generated by the magnetic field generator, and a power supply unit for supplying current to the coil while alternately changing the direction of flow of the current, wherein one of the magnetic field generator and the coil is mounted on the base, and the other thereof is mounted on the rotary table. With such an arrangement, it is possible to avoid limitations on the frequency band due to the characteristics of a link mechanism employed, thus providing a small-sized rotational vibration testing apparatus having a wide band of measuring frequencies.

What is claimed is:

1. A rotational vibration testing apparatus comprising:
   a base;
   a rotary table rotatably supported on said base through a shaft of said rotary table; and
   a vibration applying mechanism for driving said rotary table to oscillate or vibrate in a rotational direction about the axis of said shaft which acts as an axis of rotation;
   said vibration applying mechanism comprising:
      a magnetic field generating unit for generating magnetic fields;
      a coil unit arranged to traverse the magnetic fields generated by said magnetic field generating unit; and
      a power supply unit for supplying current to said coil unit while alternately changing the direction of flow of the current;
      wherein one of said magnetic field generating unit and said coil unit is mounted on said base, and the other thereof is mounted on said rotary table.

2. The rotational vibration testing apparatus according to claim 1, wherein said rotary table comprises:
   a mounting plate having a first surface for mounting thereon of an object to be tested and a second surface on the opposite sides thereof; and
   said shaft mounted upright on the second surface of said mounting plate and having an axis thereof disposed in coincidence with a center of said mounting plate, said shaft being rotatably supported on said base;
   wherein when said coil unit is mounted on said rotary table, said coil unit is mounted on either one of said mounting plate or said shaft.

3. The rotational vibration testing apparatus according to claim 2, wherein said coil unit is attached to a coil frame unit which is mounted on either one of said mounting plate and said shaft.

4. The rotational vibration testing apparatus according to claim 3, wherein said coil unit comprises a plurality of coils attached to said coil frame unit.

5. The rotational vibration testing apparatus according to claim 4, wherein said coil frame unit comprises a single coil frame, said coil frame comprising:
   an annular engaging body adapted to be fixedly mounted on the outer periphery of said rotary table; and
   a plurality of coil mounting portions disposed on the outer periphery of said annular engaging body at an equal circumferential pitch and extending radially outward from said annular engaging body.

6. The rotational vibration testing apparatus according to claim 5, wherein said annular engaging body and said plurality of coil mounting portions are formed integral with each other.

7. The rotational vibration testing apparatus according to claim 4, wherein said coil frame unit comprises a plurality of coil frames to which said coils can be respectively attached, said coil frames being adapted to be fixedly mounted on the outer periphery of said rotary table.

8. The rotational vibration testing apparatus according to claim 7, further comprising a positioning engagement portion provided on said mounting plate for positioning engagement portion provided on said mounting plate for positioning said coil.

9. The rotational vibration testing apparatus according to claim 8, wherein said positioning engagement portion comprises at least one groove or step formed on the outer peripheral portion of said rotary table, said plurality of coil frames being adapted to be fitted into said at least one groove whereby they are mounted on said rotary table.

10. The rotational vibration testing apparatus according to claim 1, wherein said magnetic field generating unit comprises a plurality of magnetic field generators, and said coil unit comprises a plurality of coils, wherein said magnetic field generators and said coils are arranged in pairs at an equal circumferential pitch about said axis of rotation.

11. The rotational vibration testing apparatus according to claim 1, further comprising a position returning mechanism for returning a positional relation between said coil unit and said magnetic field generating unit to a predetermined positional relation when power supplied to said coil unit is stopped.

12. The rotational vibration testing apparatus according to claim 11, wherein said position returning mechanism comprises a resiliently operated mechanism for resiliently generating a returning force for returning the positional relation between said coil unit and said magnetic field generating unit to said predetermined positional relation.

13. The rotational vibration testing apparatus according to claim 11, wherein said position returning mechanism comprises a magnetically operated mechanism for magnetically generating a returning force for returning the positional relation between said coil unit and said magnetic field generating unit to said predetermined positional relation.

14. The rotational vibration testing apparatus according to claim 1, further comprising a cooling unit for cooling said coil unit.

15. The rotational vibration testing apparatus according to claim 1, further comprising a current feed-back element for feeding back a coil current supplied to said coil unit so as to control the coil current to a constant level.

16. The rotational vibration testing apparatus according to claim 1, further comprising an acceleration sensor for sensing an acceleration of said rotary table, wherein an output of said acceleration sensor is fed back so as to control a coil current supplied to said coil unit to thereby make the acceleration of said rotary table a constant value.

17. The rotational vibration testing apparatus according to claim 1, further comprising:
   an arm protruded from said rotary table; and
   a stop adapted to engage said arm for limiting a movement of said arm and hence of said rotary table;
   wherein said arm and said stop are arranged such that when said rotary table is driven to rotate to an excessive extent so as to engage said stop by means of said vibration applying mechanism.

18. The rotational vibration testing apparatus according to claim 1, wherein said coil unit comprises a plurality of coils electrically connected in series with each other.

19. The rotational vibration testing apparatus according to claim 1, wherein said coil unit comprises a plurality of coils electrically connected in parallel with each other.

20. The rotational vibration testing apparatus according to claim 1, wherein said coil unit comprises a plurality of coils electrically connected with each other in a combination of series and parallel connections.

* * * * *